US012686204B2

(12) United States Patent
Cheng

(10) Patent No.: US 12,686,204 B2
(45) Date of Patent: Jul. 21, 2026

(54) STENCIL PRINTER

(71) Applicant: Illinois Tool Works Inc., Glenview, IL (US)

(72) Inventor: Zaizai Cheng, Suzhou (CN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/752,258

(22) Filed: Jun. 24, 2024

(65) Prior Publication Data

US 2025/0001753 A1 Jan. 2, 2025

(30) Foreign Application Priority Data

Jun. 30, 2023 (CN) ......................... 202310799351.2

(51) Int. Cl.
*B41F 15/18* (2006.01)
*B41L 29/14* (2006.01)

(52) U.S. Cl.
CPC .............. *B41F 15/18* (2013.01); *B41L 29/14* (2013.01)

(58) Field of Classification Search
CPC ........... B41F 15/18; B41F 15/20; B41L 29/14
See application file for complete search history.

(56) References Cited

U.S. PATENT DOCUMENTS

| | | | |
|---|---|---|---|
| 8,181,571 B2 | 5/2012 | Kusunoki | |
| 9,409,248 B2 | 8/2016 | Ootake | |
| 10,889,103 B2 | 1/2021 | Kondo | |
| 2016/0200091 A1 | 7/2016 | Mizukoshi | |
| 2018/0139875 A1* | 5/2018 | Yoo | B41F 15/34 |

FOREIGN PATENT DOCUMENTS

| | | | |
|---|---|---|---|
| CN | 1846994 | 10/2006 | |
| CN | 111683813 | 9/2020 | |
| JP | 4995223 | 8/2012 | |
| JP | 2015098087 A * | 5/2015 | |
| JP | 2015100943 A * | 6/2015 | B23K 1/0016 |
| JP | 5768213 B2 * | 8/2015 | |
| KR | 20100059310 | 6/2010 | |

OTHER PUBLICATIONS

European Office Communication with extended search report Appln No. 24183437.3 dated Nov. 25, 2024.

* cited by examiner

*Primary Examiner* — Christopher E Mahoney
*Assistant Examiner* — Marissa Ferguson-Samreth
(74) *Attorney, Agent, or Firm* — McAndrews, Held & Malloy, Ltd.

(57) ABSTRACT

The present disclosure provides a stencil printer comprising a stencil support and a clamping assembly, wherein the stencil support is movable relative to a stencil and comprises a holder and an attraction portion, the holder being movably connected to the attraction portion, and the attraction portion being capable of applying an attraction force to the stencil; and the clamping assembly is capable of clamping or releasing the attraction portion, and when the attraction portion is clamped by the clamping assembly, the holder is capable of moving a predetermined distance relative to the attraction portion in a direction away from the attraction portion and the attraction portion is capable of keeping in position relative to the stencil. The stencil printer in the present disclosure can prevent residual solder paste on the stencil from dripping due to shaking of the stencil when a processing element is away from the stencil.

3 Claims, 10 Drawing Sheets

STENCIL PRINTER

RELATED APPLICATIONS

The present application claims the benefit of Chinese (CN) patent application Ser. No. 202310799351.2, filed Jun. 30, 2023. The entirety of Chinese (CN) patent application Ser. No. 202310799351.2 is expressly incorporated herein by reference.

TECHNICAL FIELD

The present disclosure relates to a stencil printer, and in particular to a solder paste stencil printer for a printed circuit board.

BACKGROUND

In a typical surface-mount circuit board production process, a stencil printer is used to print solder paste onto a printed circuit board. A circuit board, broadly referred to as an electronic substrate, having a pattern of pads or some other conductive surfaces onto which solder paste can be deposited, is fed into the stencil printer. Small holes or marks on the circuit board, referred to as datum points, are used to align the circuit board with the stencil or screen of the stencil printer prior to the printing of solder paste onto the circuit board. The datum points are used as reference points when aligning the circuit board with the stencil. Once the circuit board has been aligned with the stencil of the printer, the circuit board is raised to the stencil by a circuit board support, and fixed with respect to the stencil. The circuit board support may be a table having pins or other object supporters, for example. Solder paste is then dispensed by moving a squeegee or scraper across the stencil so as to force the solder paste through holes formed in the stencil and onto the circuit board. As the scraper moves across the stencil, the solder paste rolls in front of the scraper such that the solder paste can be mixed and sheared as desired to obtain the desired adhesion so as to facilitate filling the holes in the screen or stencil. The solder paste is typically dispensed onto the stencil from a standard solder paste supply cartridge. After the printing operation is completed, the circuit board is released, lowered away from the stencil, and then conveyed to another position in a printed circuit board production line.

The pattern on the circuit board matches the pattern formed by mesh holes in the stencil, which enables the solder paste to be printed from the mesh holes to the desired position on the circuit board, and to be printed correctly on the circuit board.

BRIEF SUMMARY

The present disclosure provides a stencil printer, comprising: a stencil support and a clamping assembly, wherein the stencil support is movable relative to a stencil and comprises a holder and an attraction portion, the holder being movably connected to the attraction portion and the attraction portion being capable of applying an attraction force to the stencil; and wherein the clamping assembly is capable of clamping or releasing the attraction portion, and when the attraction portion is clamped by the clamping assembly, the holder is capable of moving a predetermined distance relative to the attraction portion in a direction away from the attraction portion and the attraction portion is capable of keeping in position relative to the stencil.

In the stencil printer as described above, the stencil support has first and second operating positions in which the attraction portion of the stencil support is close to the stencil, and a release position in which the stencil support is away from the stencil; during the change of the stencil support from the first operating position to the second operating position, the attraction portion is clamped by the clamping assembly, such that the holder is capable of moving relative to the attraction portion in the direction away from the attraction portion; and during the change of the stencil support from the second operating position to the release position, the attraction portion is released by the clamping assembly, and the attraction portion is away from the stencil.

The stencil printer as described above further includes an attraction portion moving assembly connected to the holder and the attraction portion, the attraction portion moving assembly being configured to be capable of driving the attraction portion to move toward the holder.

The stencil printer as described above further includes a control device and an executing device, wherein the executing device is capable of executing or stopping an attraction operation of the attraction portion; and the control device is capable of sending a control signal to the executing device to execute or stop the attraction operation of the attraction portion.

In the stencil printer as described above, the control device is configured such that when the stencil support is in the first and second operating positions, the control device controls the executing device to execute the attraction operation of the attraction portion; and that when the stencil support is away from the first and second operating positions, the control device controls the executing device to stop the attraction operation of the attraction portion.

The stencil printer as described above further includes a vacuumizing device connected to the attraction portion by means of the executing device, the vacuumizing device being capable of providing the attraction force to the attraction portion.

In the stencil printer as described above, a processing element is in contact with the stencil in the first operating position of the stencil support, and the processing element is separated from the stencil in the second operating position of the stencil support.

The stencil printer as described above further includes a table moving assembly connectable to the holder, the table moving assembly being movable to drive the stencil support to move close to or away from the stencil.

In the stencil printer as described above, the clamping assembly comprises a cylinder or an electric motor.

In the stencil printer as described above, the attraction portion moving assembly comprises a cylinder or an electric motor.

In the stencil printer as described above, the predetermined distance is greater than 1 mm.

In the stencil printer as described above, during the change of the stencil support from the second operating position to the release position, the attraction portion moving assembly is capable of driving the attraction portion to move toward the holder.

The present disclosure further provides a method for controlling a stencil printer comprising a stencil support and a printing device, the method comprising the steps of:

a. moving the stencil support and a processing element to bring the stencil support and the processing element into contact with a stencil;
b. printing the processing element by the printing device;

c. moving the processing element away from the stencil, wherein the stencil support is kept in contact with the stencil during the movement of the processing element away from the stencil; and d. moving the stencil support away from the stencil.

In the method for controlling a stencil printer as described above, in the step b and the step c, the stencil support applies an attraction force to the stencil.

In the method for controlling a stencil printer as described above, after the step c is finished, the stencil support stops the attraction force applied to the stencil, and the step d is carried out.

The solder paste printer in the present disclosure is used for printing a processing element, such as a circuit board. The stencil printer in the present disclosure includes the stencil support and the clamping assembly. The stencil support includes the attraction portion that can attract the stencil to prevent the stencil from moving or vibrating. The clamping assembly can clamp or release the attraction portion of the stencil support, such that when the processing element is just be printed and moves away from the stencil, the clamping assembly can clamp the attraction portion to enable the attraction portion to continue to attract the stencil, thereby preventing residual solder paste on the stencil from dripping onto the processing element due to the movement of the stencil.

DETAILED DESCRIPTION

Various specific embodiments of the present disclosure will be described below with reference to the accompanying drawings which constitute part of the present specification. It should be understood that although the terms indicating orientations, such as "front", "rear", "upper", "lower", "left", "right", "top" and "bottom", are used in the present disclosure to describe orientations of illustrative structural parts and elements in various examples of the present disclosure, these terms used herein are only for ease of description and are determined based on the exemplary orientations as shown in the accompanying drawings. Since the embodiments disclosed in the present disclosure may be arranged in different directions, these terms indicating directions are only illustrative and should not be considered as limitations. If possible, the same or similar reference signs used in the present disclosure refer to the same components.

Figure 1:
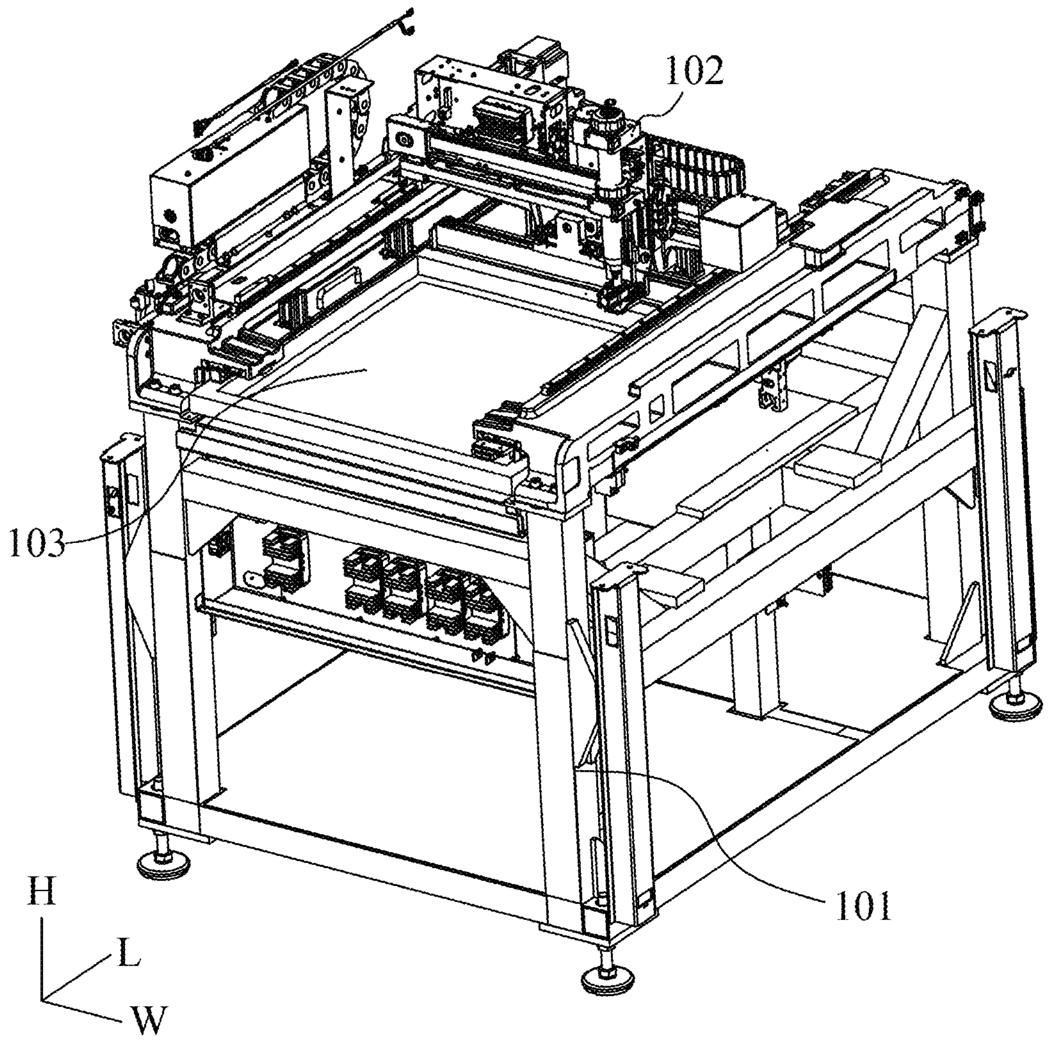
FIG. 1 is a schematic diagram of a stencil printer according to the present disclosure.

FIG. 1 is a schematic diagram of a stencil printer according to the present disclosure. As shown in FIG. 1, the stencil printer includes a frame 101, a printing device 102, and a stencil 103. The stencil 103 is provided with mesh holes. The stencil 103 is connected to the frame 101. A conveying and supporting device 200 (obscured by the stencil 103 in FIG. 1) is disposed below the stencil 103. The conveying and supporting device 200 can convey and fix a processing element (e.g., a circuit board) to a corresponding position below the stencil 103. The printing device 102 is disposed above the stencil. The printing device 102 can apply and coat solder paste onto the stencil 103, and the solder paste is printed onto a surface of the processing element through the mesh holes in the stencil 103.

Figure 2A:
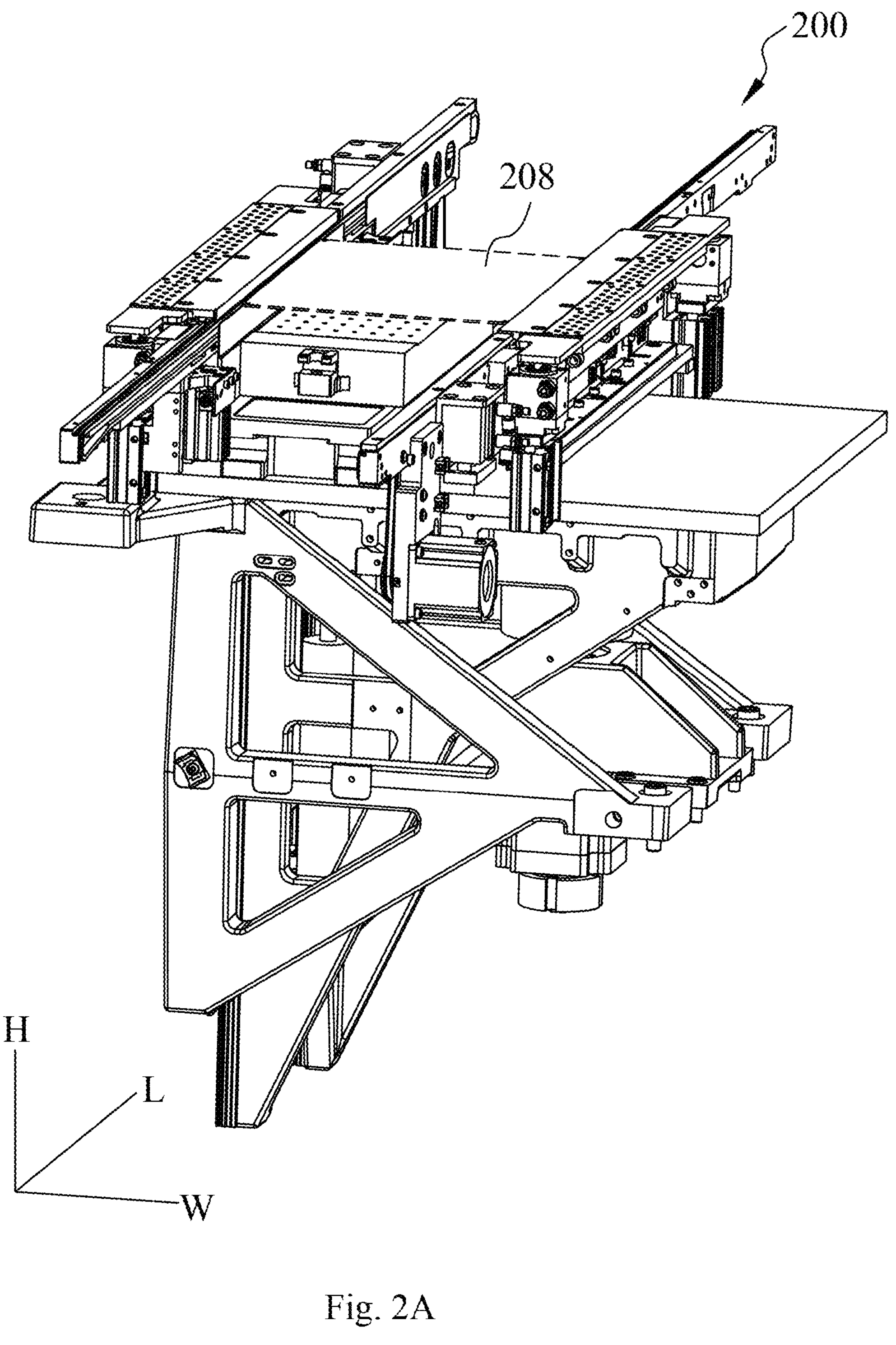
FIG. 2A is a perspective view of a conveying and supporting device of the stencil printer according to the present disclosure.
Figure 2B:
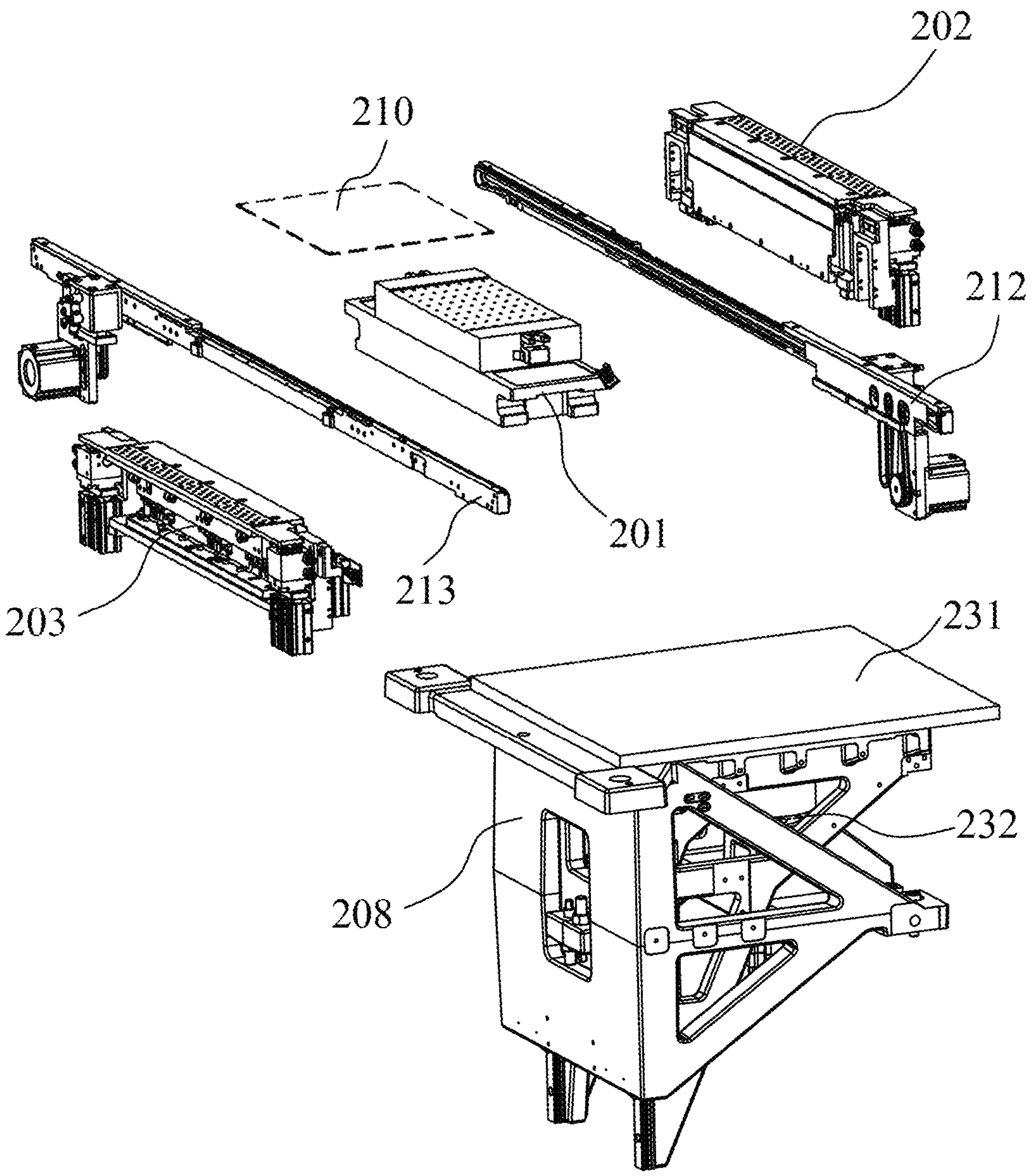
FIG. 2B is an exploded view of the conveying and supporting device of the stencil printer in FIG. 2A.

FIG. 2A is a perspective view of a conveying and supporting device of the stencil printer in the present disclosure, and FIG. 2B is an exploded view of the conveying and supporting device of the stencil printer in FIG. 2A. As shown in FIGS. 2A and 2B, the conveying and supporting device has a height direction H, a length direction L, and a width direction W. The conveying and supporting device includes a pair of rail assemblies 212 and 213, a pair of stencil supports 202 and 203, a circuit board support 201, and a table moving assembly 208. FIGS. 2A and 2B further schematically illustrate a circuit board 210. The pair of rail assemblies 212 and 213 and the pair of stencil supports 202 and 203 extend in the length direction of the conveying and supporting device. The rail assemblies 212 and 213 can convey the circuit board 210 in the length direction L. The pair of rail assemblies 212 and 213 are arranged in the width direction W of the conveying and supporting device, and have a spacing therebetween. The circuit board support 201 is disposed between the pair of rail assemblies 212 and 213 and is used for supporting the circuit board 210. The pair of stencil supports 202 and 203 are respectively disposed at outer sides of the pair of rail assemblies 212 and 213 and are used for supporting the stencil 103. The table moving assembly 208 is disposed below the rail assemblies 212 and 213 and the circuit board support 201. The table moving assembly includes a platform portion 231 and a power portion 232. The power portion 232 can drive the platform portion 231 to move in a direction toward or away from the stencil 103. The stencil supports 202 and 203 and the circuit board support 201 are connectable to the platform portion

231 such that the stencil supports 202 and 203 and the circuit board support 201 can move with the platform portion 231.

In the present disclosure, the rail assemblies 212 and 213 are similar in structure, and the stencil supports 202 and 203 are similar in structure. The structure of the stencil support is described below by taking the stencil support 202 as an example.

Figure 3A:
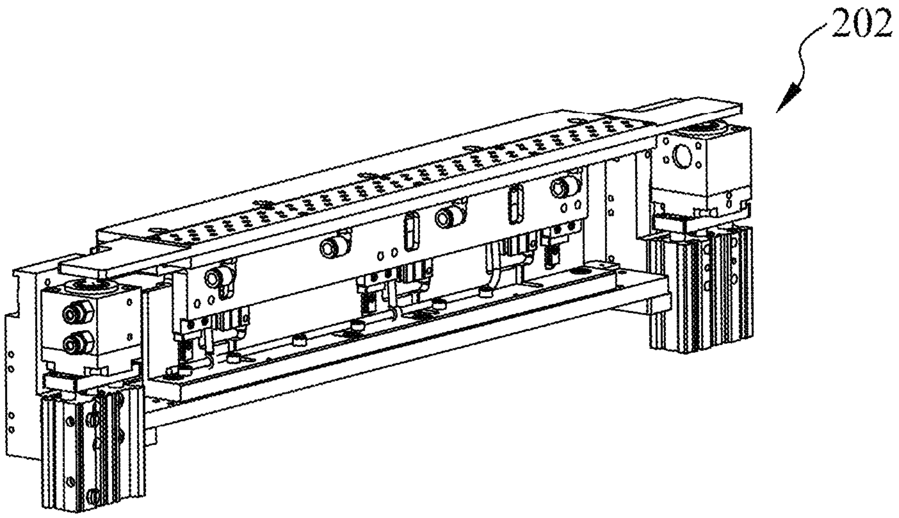
FIG. 3A is a perspective view of one of stencil supports in FIG. 2A.
Figure 3B:
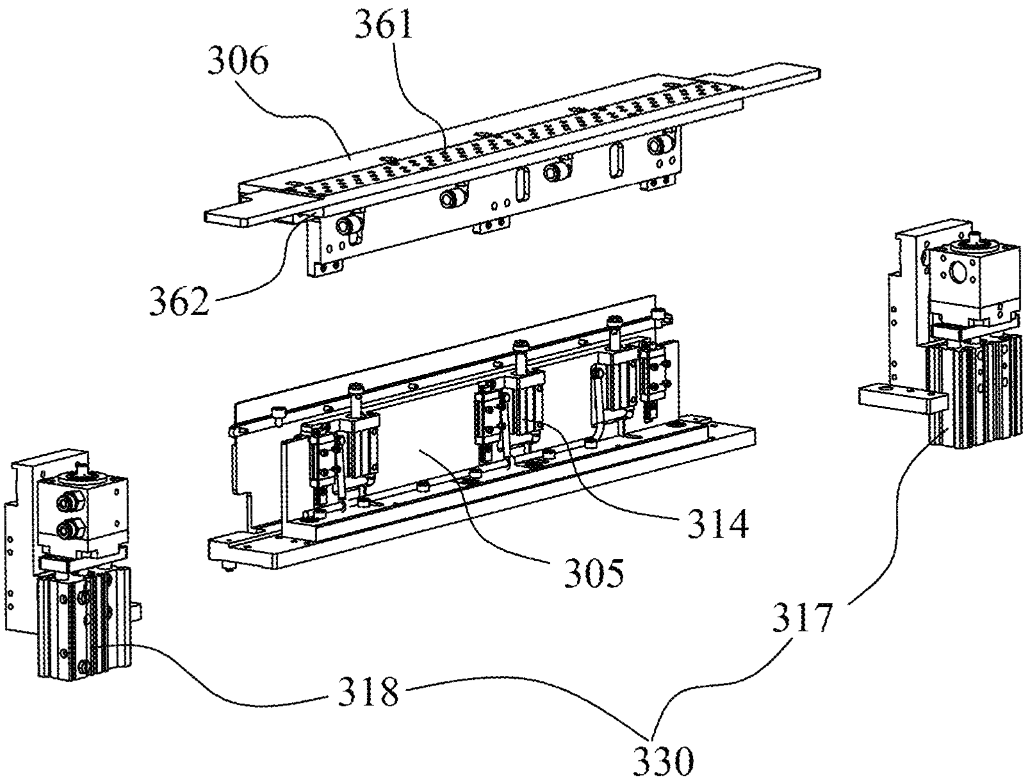
FIG. 3B is an exploded view of the stencil support in FIG. 3A.

FIG. 3A is a perspective view of one of the stencil supports in FIG. 2A, and FIG. 3B is an exploded view of the stencil support in FIG. 3A. FIGS. 3A and 3B illustrate the structure of the stencil support 202 in FIG. 2A. As shown in FIGS. 3A and 3B, the stencil support 202 includes a holder 305, an attraction portion 306, an attraction portion moving assembly 314, and a clamping assembly 330. The attraction portion 306 is slidably connected to the holder 305 such that the attraction portion 306 can move relative to the holder 305 in the height direction H of the conveying and supporting device of the stencil printer. The clamping assembly 330 includes a first portion 317 and a second portion 318. The first portion 317 and the second portion 318 are respectively disposed below two ends of the attraction portion 306 in the length direction, and can support and release the attraction portion 306. The attraction portion moving assembly 314 is mounted on the holder 305 and connected to the attraction portion 306, and the attraction portion moving assembly 314 can apply a pulling force to the attraction portion 306.

The attraction portion 306 has a cavity 362, and the cavity 362 is connected with a vacuumizing device 450. A plurality of holes 361 are formed in a top surface of the attraction portion 306, and the plurality of holes 361 are connected with the cavity 362. The vacuumizing device 450 can reduce the internal pressure of the cavity 362 such that the top surface of the attraction portion 306 has an attraction force and can attract the stencil.

In one embodiment of the present disclosure, the attraction portion moving assembly 314, and the first portion 317 and the second portion 318 of the clamping assembly 330 are cylinders, respectively. In another embodiment of the present disclosure, one or more of the attraction portion moving assembly 314, and the first portion 317 and the second portion 318 of the clamping assembly 330 are electric motors.

Figure 4:
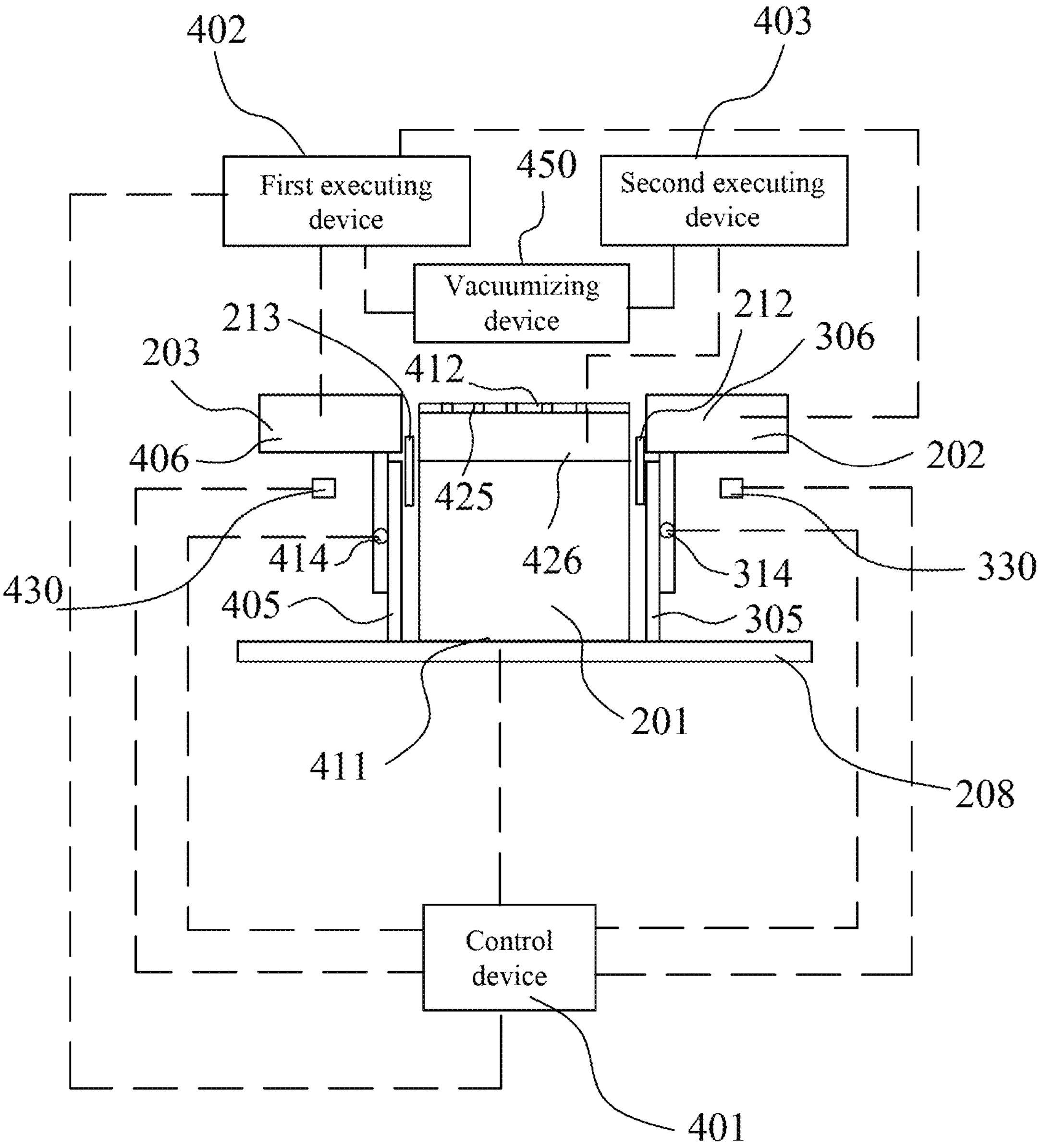
FIG. 4 is a schematic diagram of the conveying and supporting device of the stencil printer in FIG. 2A.

FIG. 4 is a schematic diagram of the conveying and supporting device of the stencil printer in FIG. 2A. FIG. 4 is a schematic diagram of the conveying and supporting device of the stencil printer in FIG. 2A viewed in the length direction. As shown in FIGS. 2A and 4, the rail assemblies 212 and 213 have a spacing therebetween that matches the width of the processing element to be conveyed, and the two ends of the processing element can be supported and conveyed by the rail assemblies 212 and 213. The circuit board support 201 is disposed between the rail assemblies 212 and 213 in the width direction of the conveying and supporting device. The bottom 411 of the circuit board support 201 is connected to the table moving assembly 208, and the top 412 of the circuit board support 201 is configured to support the circuit board. The top 412 of the circuit board support 201 is provided with a cavity 426, a plurality of holes 425 are formed in the surface of the top 412, and the plurality of holes 425 are connected with the cavity 426. The cavity 426 is connected with the vacuumizing device 450 by means of a second executing device 403. The vacuumizing device 450 can reduce the air pressure of the cavity 426 such that the surface of the top 412 of the circuit board support 201 has an attraction force and can attract the circuit board. That is, the top 412 of the circuit board support 201 is provided with a circuit board attraction portion.

The stencil support 202 is disposed at the outer side of the rail assembly 212 and is slidably connected to the rail assembly 212, and a limiting device (not shown in the figure) is provided between the stencil support 202 and the rail assembly 212 to limit the downward movement distance of the stencil support 202 relative to the rail assembly 212 in the height direction H of the conveying and supporting device, that is, the stencil support 202 can slide relative to the rail assembly 212 within a certain range in the height direction H of the conveying and supporting device. The stencil support 202 has the holder 305 and the attraction portion 306. The bottom of the holder 305 is provided with a magnetic component that can be attracted to the top surface of the table moving assembly 208 or separated from the top surface of the table moving assembly 208.

Similarly, the stencil support 203 is disposed at the outer side of the rail assembly 213 and is slidably connected to the rail assembly 213, and a limiting device (not shown in the figure) is provided between the stencil support 203 and the rail assembly 213 to limit the downward movement distance of the stencil support 203 relative to the rail assembly 213 in the height direction H of the conveying and supporting device, that is, the stencil support 203 can slide relative to the rail assembly 213 within a certain range in the height direction H of the conveying and supporting device. The stencil support 203 has a holder 405 and an attraction portion 406. The bottom of the holder 405 is provided with a magnetic component that can be attracted to the top surface of the table moving assembly 208 or separated from the top surface of the table moving assembly 208.

The attraction portion 306 and the attraction portion 406 are connected to the vacuumizing device 450 by means of a first executing device 402. The first executing device 402 is connected to a control device 401 and can receive a signal from the control device 401 to turn on or off the first executing device. When the first executing device 402 is turned on, the attraction portion 306 and the attraction portion 406 can execute the attraction operation, so as to generate an attraction force to attract the stencil; and when the first executing device 402 is turned off, the attraction portion 306 and the attraction portion 406 stop the attraction operation, so that the attraction portion 306 and the attraction portion 406 no longer generate an attraction force.

Clamping assemblies 330 and 430 are provided below the attraction portion 306 and the attraction portion 406, respectively, and the clamping assemblies 330 and 430 are connected to the control device 401 and can receive a signal from the control device 401 to clamp or release the attraction portion 306 and the attraction portion 406, respectively.

The attraction portion moving assemblies 314 and 414 are connected to the control device 401 and can receive a signal from the control device 401 to pull the attraction portions 306 and 406, respectively. The attraction portion moving assemblies 314 and 414 are configured to overcome the friction between the attraction portions 306 and 406 and the holders 305 and 405 such that the attraction portions 306 and 406 can be restored to the positions closest to the holders 305 and 405.

In one embodiment of the present disclosure, the first executing device 402 and the second executing device 403 are solenoid valves.

Figure 5A:
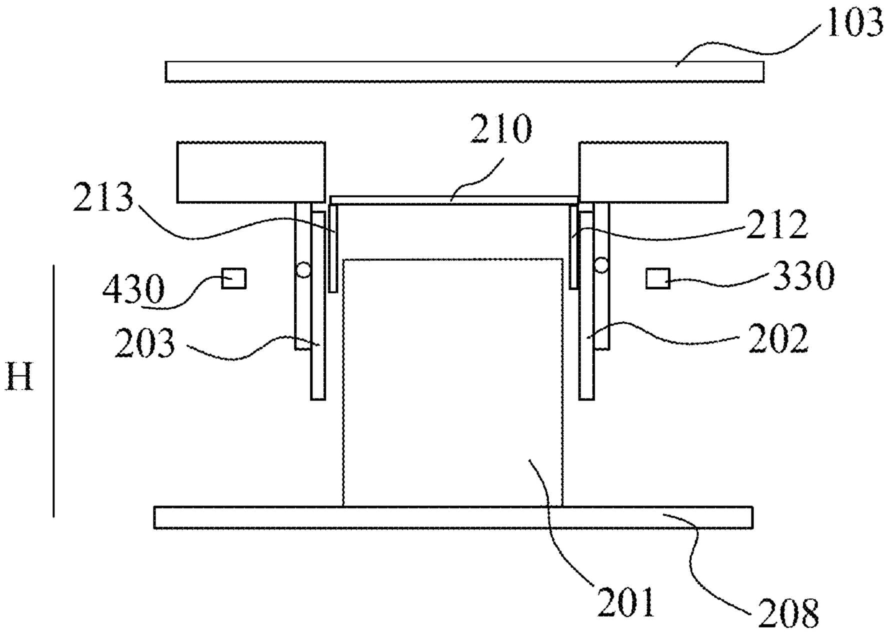
FIG. 5A is a schematic diagram of the conveying and supporting device when a table moving assembly is in an initial state.
Figure 5B:
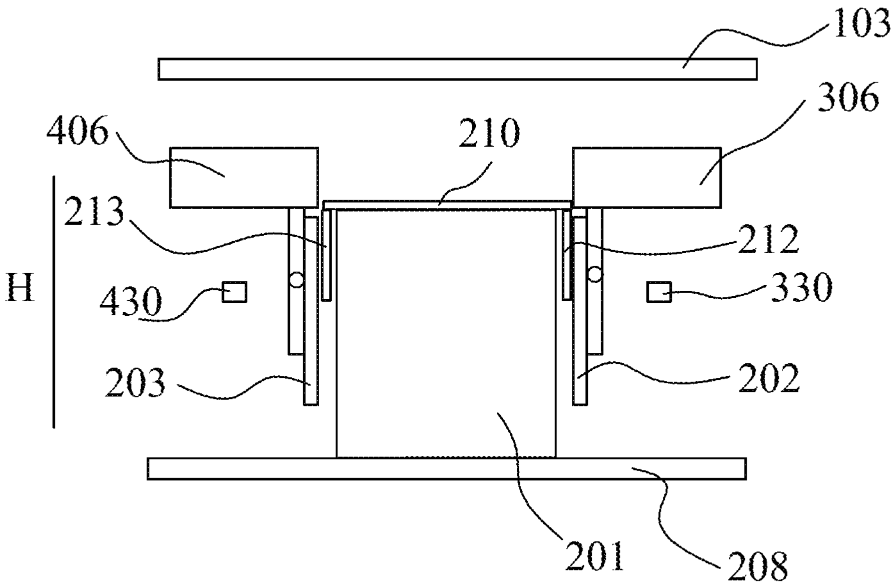
FIG. 5B is a schematic diagram of the conveying and supporting device when the table moving assembly moves until the circuit board support is in contact with a circuit board.
Figure 5C:
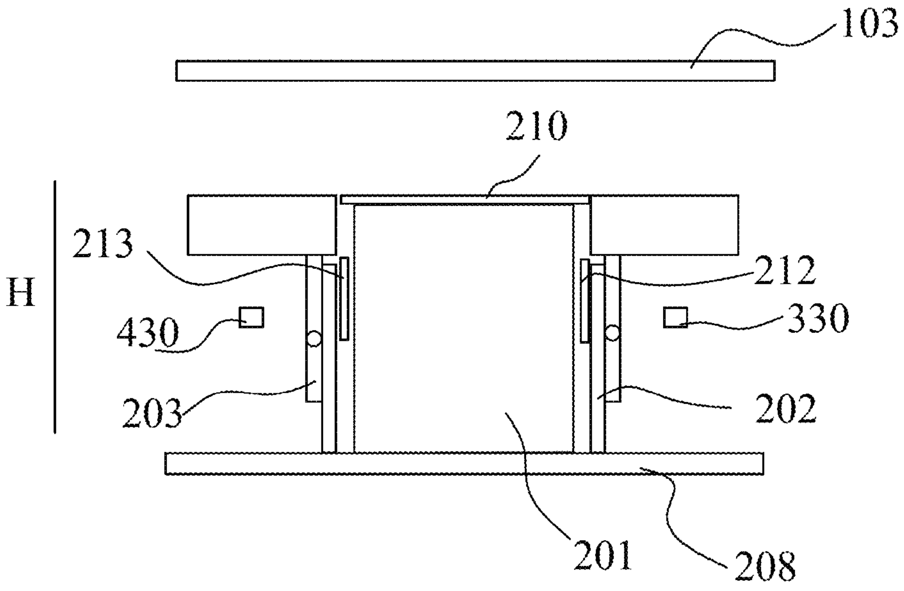
FIG. 5C is a schematic diagram of the conveying and supporting device when the table moving assembly moves until the circuit board is flush with the tops of the stencil supports.
Figure 5D:
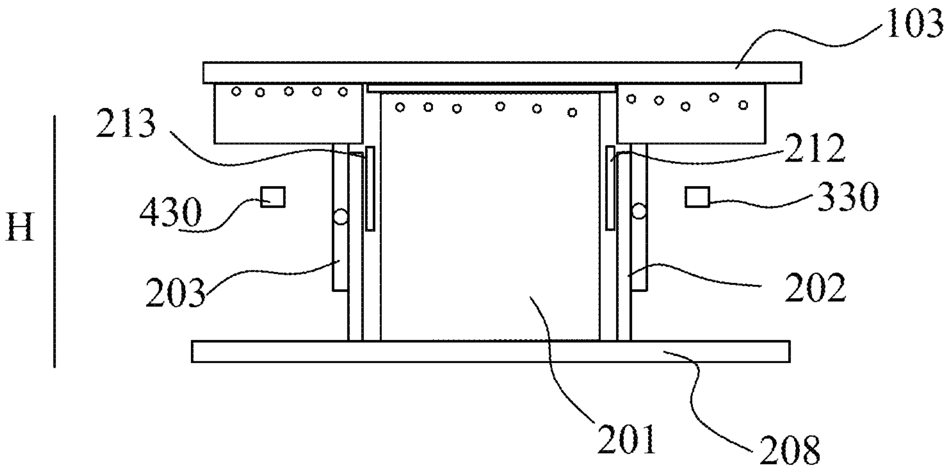
FIG. 5D is a schematic diagram of the conveying and supporting device when the table moving assembly moves until the circuit board is in contact with a stencil.
Figure 5E:
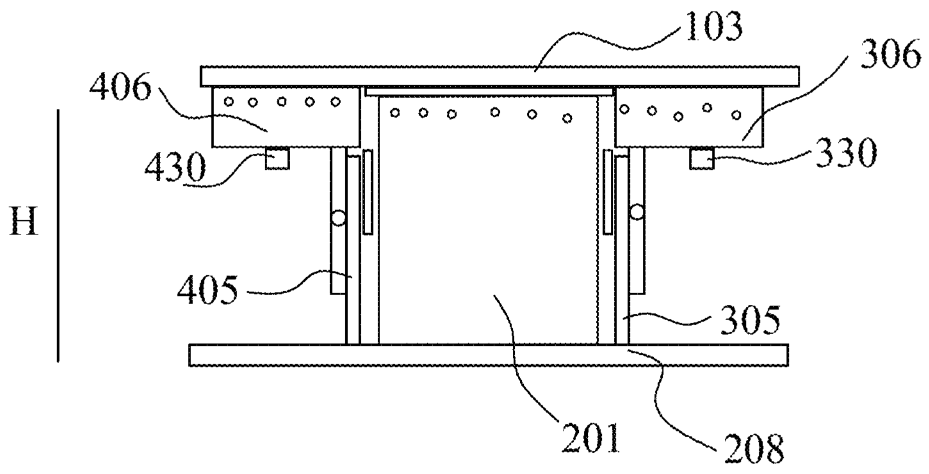
FIG. 5E is a schematic diagram of the conveying and supporting device when a clamping assembly clamps an attraction portion and the circuit board is in contact with the stencil.
Figure 5F:
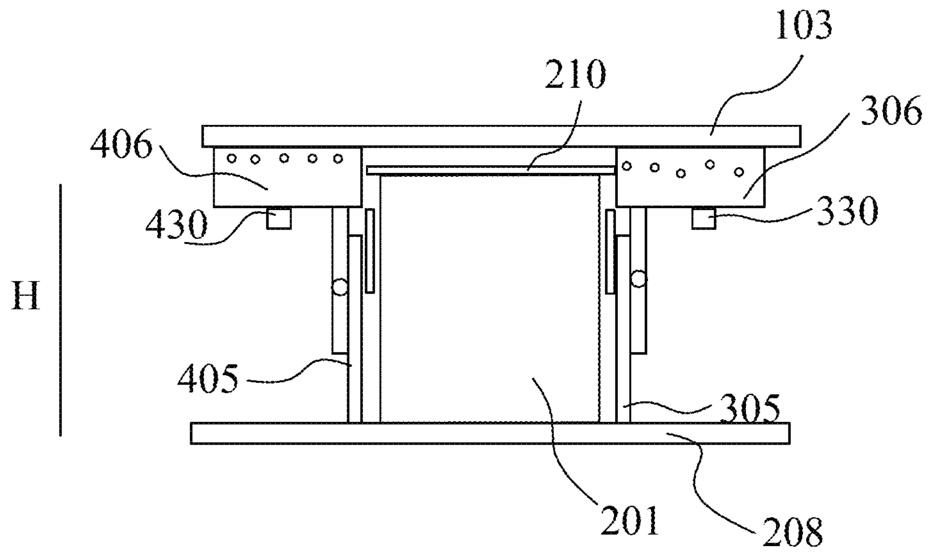
FIG. 5F is a schematic diagram of the conveying and supporting device when the clamping assembly clamps the attraction portion and the circuit board is away from the stencil.
Figure 5G:
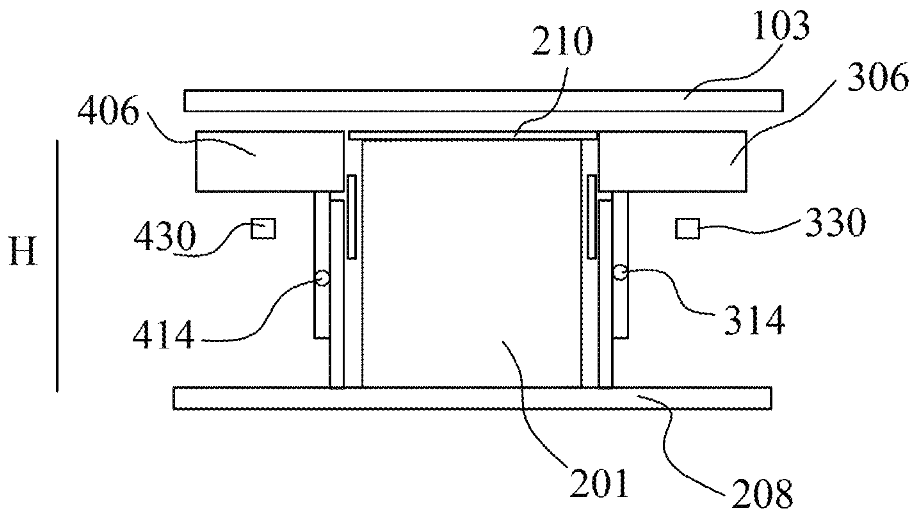
FIG. 5G is a schematic diagram of the conveying and supporting device after the clamping assembly releases the attraction portions.

FIG. 5A is a schematic diagram of the conveying and supporting device when a table moving assembly is in an initial state; FIG. 5B is a schematic diagram of the conveying and supporting device when the table moving assembly moves until the circuit board support is in contact with a circuit board; FIG. 5C is a schematic diagram of the conveying and supporting device when the table moving assembly moves until the circuit board is flush with the tops of the stencil supports; FIG. 5D is a schematic diagram of the conveying and supporting device when the table moving assembly moves until the circuit board is in contact with a stencil; FIG. 5E is a schematic diagram of the conveying and supporting device when a clamping assembly clamps an attraction portion and the circuit board is in contact with the stencil; FIG. 5F is a schematic diagram of the conveying and supporting device when the clamping assembly clamps the attraction portion and the circuit board is away from the stencil; and FIG. 5G is a schematic diagram of the conveying and supporting device after the clamping assembly releases the attraction portions. FIGS. 5A to 5G illustrate an operation process of the conveying and supporting device.

As shown in FIG. 5A, the circuit board 210 is conveyed by the rail assemblies 212 and 213 until it reaches a specific position below the stencil 103. Here, the circuit board 210 is supported by the rail assemblies 212 and 213, there is a spacing between the circuit board 210 and the stencil 103, and the circuit board 210 is aligned with a specific region of the stencil 103. The table moving assembly 208 is in the farthest position relative to the stencil 103, that is, in the lowest position in the height direction of the conveying and supporting device. The circuit board support 201 is connected to the table moving assembly 208, the circuit board support 201 is also in the farthest position relative to the stencil 103, and the circuit board support 201 is located below the circuit board 210 and there is a spacing between the circuit board support 201 and the circuit board 210. The stencil supports 202 and 203 are in the farthest position relative to the stencil 103. The stencil supports 202 and 203 are supported by the rail assemblies 212 and 213 and are separated from the table moving assembly 208, and there is a spacing between the stencil supports 202 and 203 and the table moving assembly 208. The clamping assemblies 330 and 430 are in a release state, and there is a spacing between the clamping assemblies 330 and 430 and the attraction portions of the stencil supports 202 and 203. In one embodiment of the present disclosure, in the initial state, the stencil supports 202 and 203 have a distance of 35 to 50 mm from the stencil 103.

As shown in FIG. 5B, when a printing operation for the circuit board starts, the table moving assembly 208 moves upward (i.e., in a direction toward the stencil 103) in the height direction H such that the circuit board support 201 moves toward the stencil 103 along with the table moving assembly 208. The circuit board support 201 gradually approaches the circuit board 210 and can be in contact with the circuit board 210. FIG. 5B illustrates a position in which the circuit board support 201 is in contact with the circuit board 210. During the movement from FIG. 5A to FIG. 5B, the table moving assembly 208 and the circuit board support 201 move together, the stencil supports 202 and 203 are kept in position, and the spacing between the stencil supports 202 and 203 and the table moving assembly 208 is gradually reduced. The clamping assemblies 330 and 430 keep in the release state.

As shown in FIG. 5C, the table moving assembly 208 drives the circuit board support 201 to continue to move toward the stencil 103, and the circuit board support 201 drives the circuit board 210 to move away from the rail assemblies 212 and 213 and toward the stencil 103. When the circuit board 210 is flush with the tops of the stencil supports 202 and 203, the bottoms of the stencil supports 202 and 203 are in contact with the table moving assembly 208. The bottoms of the stencil supports 202 and 203 are provided with magnetic elements that can attract the surface of the table moving assembly 208 such that the table moving assembly 208 is connected to the stencil supports 202 and 203. The clamping assembly 330 and 430 keep in the release state.

As shown in FIG. 5D, the table moving assembly 208 continues to move toward the stencil 103, then the table moving assembly 208 drives the circuit board support 201 and the stencil supports 202 and 203 together to continue to move toward the stencil 103 until the circuit board 210 and the tops of the stencil supports 202 and 203 are in contact with the stencil 103, and the stencil supports 202 and 203 reach a first operating position. When the stencil supports 202 and 203 move to the first operating position, the control device 401 controls to turn on the first executing device 402 and the second executing device 403 such that the circuit board support 201 executes the attraction operation to generate an attraction force to attract the circuit board 210, and the stencil supports 202 and 203 execute the attraction operation to generate an attraction force to attract the stencil 103. In the position shown in FIG. 5D where the first executing device 402 and the second executing device 403 remain turned on, the printing device 102 executes a printing operation. Since both the circuit board 210 and the stencil 103 are subjected to the action of the attraction forces, the circuit board 210 and the stencil 103 can remain relatively stable during printing and are not prone to shaking or shifting, which is conducive to ensuring the printing quality.

As shown in FIG. 5E, during printing of the printing device 102 or after the printing, the clamping assemblies 330 and 430 clamp and lock the attraction portions 306 and 406 of the stencil supports 202 and 203, so that the attraction portions 306 and 406 are kept in the first operating position that is in contact with the stencil 103, and cannot move in the height direction H.

As shown in FIG. 5F, after the printing by the printing device 102 is finished, the control device 401 controls the table moving assembly 208 to move downward, that is, in a direction away from the stencil 103. The circuit board support 201 moves downward along with the table moving assembly 208 such that the circuit board 210 is away from the stencil 103. The holders 305 and 405 of the stencil supports 202 and 203 can attract the table moving assembly 208 under a magnetic action, so that the holders 305 and 405 move downward along with the table moving assembly 208. The attraction portions 306 and 406 of the stencil supports 202 and 203 are clamped by the clamping assemblies 330 and 430 and thus cannot move downward along with the table moving assembly 208, so that the attraction portions 306 and 406 slide relative to the holders 305 and 405, and the stencil supports 202 and 203 reach a second operating position.

During the movement of the stencil supports 202 and 203 from the first operating position to the second operating position, the circuit board support 201 moves downward along with the table moving assembly 208, the second executing device 403 remains turned on, and the circuit board 210 is attracted by the circuit board support 201 and moves away from the stencil 103 along with the circuit board support 201. During the process of the circuit board 210 being away from the stencil 103, the circuit board 210 and the stencil 103 have certain adhesion therebetween, and the movement of the circuit board 210 will drive the stencil 103 to trend to move downward. In practice, it is expected that the stencil 103 is kept stable when the circuit board 210 is away from the stencil 103, so as to prevent residual solder paste on the stencil 103 from dripping onto the circuit board 210 that has been printed. During the movement of the stencil supports 202 and 203 from the first operating position to the second operating position in the present disclosure, the first executing device 402 remains turned on and the attraction portions 306 and 406 remain to execute the attraction operation on the stencil 103, so that the stencil 103 can be kept stable and is not prone to shaking or shifting, which can prevent the residual solder paste on the stencil 103 from affecting the circuit board 210 that has been printed.

In one embodiment of the present disclosure, during the movement of the stencil supports 202 and 203 from the first operating position to the second operating position, the holders 305 and 405 move a predetermined distance of 1 mm to 3 mm relative to the attraction portions 306 and 406, that is, the circuit board 210 moves 1 mm to 3 mm. The predetermined distance is sensed by a position sensor or an electric motor of the table moving assembly 208.

As shown in FIG. 5G, after the circuit board 210 is away from the stencil 103, the control device 401 sends a control signal to the clamping assemblies 330 and 430 to enable the clamping assemblies 330 and 430 to release the attraction portions 306 and 406. The control device 401 sends a control signal to the moving assemblies 314 and 414, and the moving assemblies 314 and 414 then pull the attraction portions 306 and 406 to move toward the holders 305 and 405 to enable the attraction portions 306 and 406 to be away from the stencil 103, such that the stencil supports 202 and 203 reach a release position.

After the stencil supports 202 and 203 reach the release position as shown in FIG. 5G, the table moving assembly 208 drives the stencil supports 202 and 203 and the circuit board support 201 to continue to move downward until reaching the position shown in FIG. 5C, and the stencil supports 202 and 203 are restricted by the rail assemblies 212 and 213 and cannot continue to move downward. The table moving assembly 208 continues to move downward to overcome the magnetic force between the table moving assembly 208 and the stencil supports 202 and 203, so as to be separated from the stencil supports 202 and 203. The table moving assembly 208 continues to drive the circuit board support 201 to move downward to reach the position shown in FIG. 5B, and the circuit board 210 are in contact with the rail assemblies 212 and 213. The table moving assembly 208 then continues to move downward, the circuit board support 201 is away from the circuit board 210, the circuit board 210 is supported by the rail assemblies 212 and 213 and has a spacing from the circuit board support 201, and when the table moving assembly reaches the position shown in FIG. 5A, the conveying and supporting device is restored to the initial state. Here, the circuit board 210 that has been printed will be conveyed to a next position by the rail assemblies 212 and 213, and another circuit board that has not been processed reaches a position below the stencil 103 and is ready for printing.

In the existing design, the circuit board 210 and the stencil supports 202 and 203 are simultaneously away from the stencil 103, and when the circuit board 210 is just away from the stencil 103, the stencil 103 may move or shake slightly, and the residual solder paste on the stencil 103 may drip onto the circuit board 210, affecting the processing accuracy of the circuit board 210. In the present disclosure, the attraction portions 306 and 406 of the stencil supports 202 and 203 can be clamped by the clamping assemblies 330 and 430 and accordingly move relative to the holders 305 and 405. During the process of the circuit board 210 being away from the stencil 103, the attraction portions 306 and 406 can keep in contact with the stencil 103 and continue to apply an attraction force, thereby preventing the stencil from moving or shaking when the circuit board 210 is away from the stencil 103. That is, in the present disclosure, the attraction portions 306 and 406 of the stencil supports 202 and 203 are away from the stencil 103 at a different time from the time when the circuit board 210 is away from the stencil 103, so that the attraction portions 306 and 406 are not away from the stencil 103 when the circuit board 210 is just away from the stencil 103, and the attraction portions 306 and 406 can continue to attract the stencil 103 for a period of time to keep the stencil 103 relatively stable.

Figure 6:
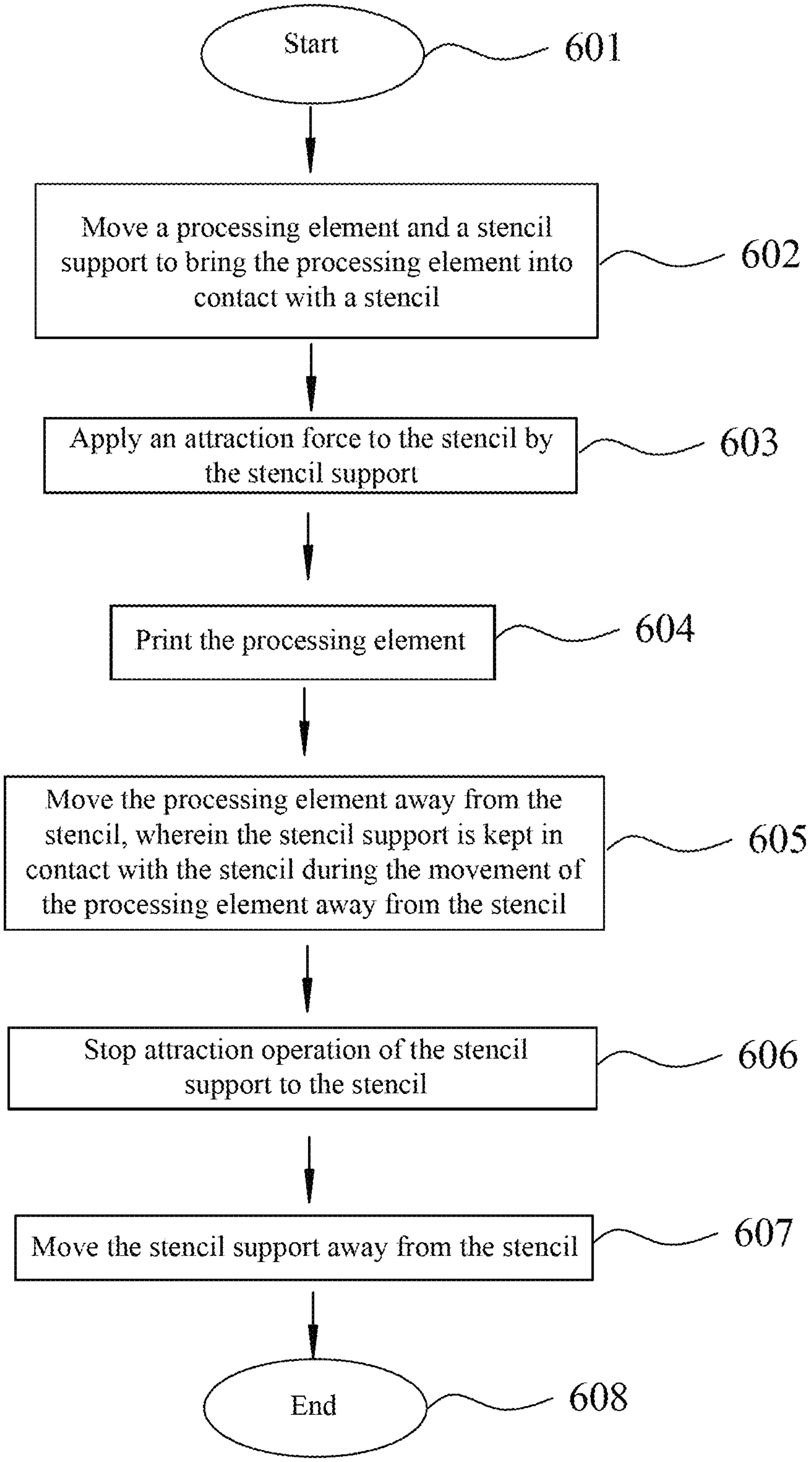
FIG. 6 is a flowchart of one embodiment of a method for controlling a stencil printer according to the present disclosure.

FIG. 6 is a flowchart of one embodiment of a method for controlling a stencil printer according to the present disclosure. As shown in FIG. 6, at step 601, the method for controlling the stencil printer starts. Before the method starts, the processing element, such as the circuit board 210, and the stencil supports 202 and 203 are in the farthest position relative to the stencil 103.

At step 602, the table moving assembly 208 drives the stencil supports 202 and 203 and the processing element to move toward the stencil 103 until both the stencil supports 202 and 203 and the processing element are in contact with one side of the stencil 103, and the printing device 102 is located at the other side of the stencil 103.

At step 603, the control device 401 controls the first executing device 402 to be turned on such that the stencil supports 202 and 203 can apply an attraction force to the stencil 103. Moreover, when the step 603 is carried out, the control device 401 controls the second executing device 403 to be turned on such that the circuit board support 201 applies an attraction force to the processing element.

At step 604, the stencil supports 202 and 203 attract the stencil 103 to keep the stencil relatively stable. The circuit board support 201 attracts the processing element to keep the processing element relatively stable. The processing element is printed by the printing device 102.

At step 605, the table moving assembly 208 drives the circuit board support 201 to move such that the processing element is away from the stencil 103. The attraction portions 306 and 406 of the stencil supports 202 and 203 are clamped by the clamping assemblies 330 and 340 such that the attraction portions 306 and 406 keep in contact with the stencil 103. At the step 605, the first executing device 402 remains turned on and the attraction portions 306 and 406 of the stencil supports 202 and 203 continuously attract the stencil.

At step 606, the control device 401 controls the first executing device 402 to be turned off such that the stencil supports 202 and 203 stop applying the attraction force to the stencil 103.

At step 607, the stencil supports 202 and 203 are away from the stencil 103. The circuit board support 201 and the stencil supports 202 and 203 move to the initial position.

Then, the process proceeds from the step 607 to step 608 to end the printing operation.

In the method shown in FIG. 6, when the processing element is just away from the stencil 103 after the printing is finished, the stencil supports 202 and 203 keep in contact with the stencil and attract the stencil 103, so as to keep the stencil stable.

Although the present disclosure is described in conjunction with the examples of embodiments outlined above, various alternatives, modifications, variations, improvements and/or substantial equivalents, which are known or anticipated at present or to be anticipated before long, may be obvious to those of at least ordinary skill in the art. In addition, the technical effects and/or technical problems described in this specification are exemplary rather than limiting; therefore, the disclosure in this specification may be used to solve other technical problems and may have other technical effects. Accordingly, the examples of the embodiments of the present disclosure as set forth above are intended to be illustrative rather than limiting. Various changes may be made without departing from the spirit or scope of the present disclosure. Therefore, the present disclosure is intended to embrace all known or earlier disclosed alternatives, modifications, variations, improvements and/or substantial equivalents.

What is claimed is:

1. A method for controlling a stencil printer comprising a stencil support and a printing device, the method comprising:

moving the stencil support and a processing element to bring the stencil support and the processing element into contact with a stencil;

applying an attraction force between the stencil support and the processing element;

printing the processing element by the printing device while applying the attraction force;

clamping the stencil support to the stencil;

moving the processing element away from the stencil, wherein the stencil support is clamped to and kept in contact with the stencil during the movement of the processing element away from the stencil; and moving the stencil support away from the stencil.

2. The method for controlling a stencil printer of claim 1, wherein the stencil support applies an attraction force to the stencil during printing the processing element and during moving the processing element away from the stencil.

3. The method for controlling a stencil printer of claim 2 wherein, after the moving of the processing element away from the stencil, the stencil support stops applying the attraction force to the stencil, followed by the moving the stencil support away from the stencil.

* * * * *